(No Model.)
C. GAYLORD.
VESSEL COVER.
No. 265,403. Patented Oct. 3, 1882.
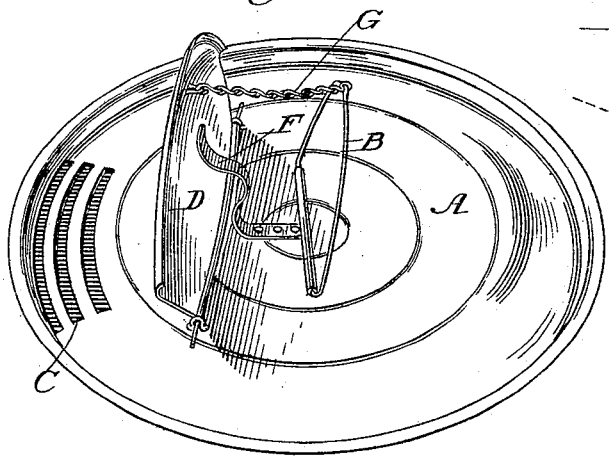
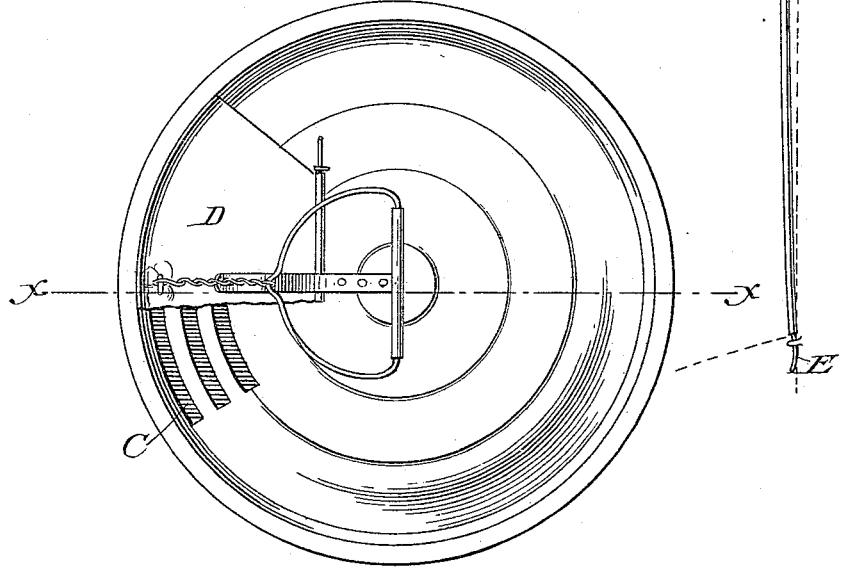
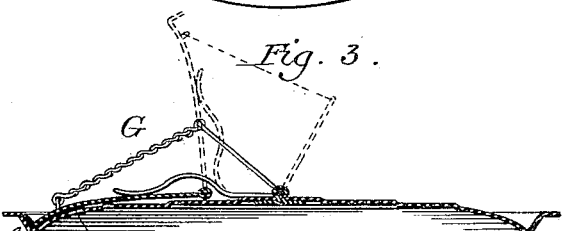
Witnesses:
Frank D. Blanchard
W. W. Elliott
Inventor:
Charles Gaylord
By Jno. G. Elliott
Attorney

UNITED STATES PATENT OFFICE.

CHARLES GAYLORD, OF CHICAGO, ILLINOIS, ASSIGNOR OF ONE-HALF TO S. P. HEDGES, OF SAME PLACE.

VESSEL-COVER.

SPECIFICATION forming part of Letters Patent No. 265,403, dated October 3, 1882.

Application filed June 19, 1882. (No model.)

*To all whom it may concern:*

Be it known that I, CHARLES GAYLORD, a citizen of the United States, residing in Chicago, in the county of Cook and State of Illinois, have invented certain new and useful Improvements in Vessel-Covers, of which the following is a specification.

My invention relates to improvements in vessel-covers provided with perforations or slots through which the boiling liquid contents of the vessel may be poured without removing the cover, and with a hinged lid closing said perforations at other times.

The objects of my invention are, first, to provide a supplemental lid so connected with a pivoted handle of the vessel-cover that when the handle is raised the lid will be lifted to a position for adapting it to operate as a guard, preventing the rising steam from scalding the hand of the operator; and, second, to provide the supplemental lid with means for causing it to automatically close upon the cover when the cover-handle is released from the grasp of the operator. I attain these objects by devices illustrated in the accompanying drawings, in which—

Figure 1 is a perspective of a vessel-cover embodying my invention; Fig. 2, a plan view of the same; Fig. 3, a cross-section on the line *x x* of Fig. 2; and Fig. 4, a detail showing the curvature given the pivot-rod of the hinge of the supplemental lid to cause the lid to spring to its operative position over the slots.

Similar letters of reference indicate the same parts in the several figures of the drawings.

A represents a vessel-cover having the usual outline and provided with a centrally-pivoted bail or handle, B, and near its periphery with slots C, through which to pour or drain the contents of the vessel to which the cover is applied.

Hinged to the cover at a point intermediate the handle and the slots is a supplemental lid, D, adapted to cover the slots and prevent the escape of steam. Lid D is preferably hinged by means of a rod, E, passing through an elongated eye formed in its edge by turning up the metal, and confined at its projecting ends by staples or lugs secured to the cover A, but permitting the rod to have a free pivotal movement. This rod, as shown in Fig. 4, is slightly bent, so that when the lid is raised toward a vertical position the rod will be strained against the cover and operate to force the lid down upon the cover; but instead of a rod-spring actuating the lid D a curved spring, F, may be secured to the cover, so as to press upon the lid as it is being raised.

Secured toward the outer edge of the lid is a chain, G, attached at its opposite end to the top of the bail B, which chain is of a length sufficient to cause the handle, when raised to a vertical position, to lift the lid to substantially the same position, so as to interpose the lid between the hand of the operator and the rising steam, and thus effectually guard the hand from scalding. As shown in Fig. 3, the lid is lowered to cover the slots, while the bail is at an oblique angle to the plane of the cover and convenient to grasp; but as indicated by the dotted lines the lid is raised to nearly a vertical position while the bail is swung to an oblique angle nearly opposing its former position; but this position assumed by the bail naturally follows the ordinary manner of tilting a vessel when resting upon a stove or other support.

The important feature of my invention is in connecting the lid D with the pivoted bail or other suitable device employed for holding the cover upon the vessel when tilting it, and to this end it is immaterial what may be the form of the bail or the particular point at which it is located upon the cover, or the special manner in which it is connected with the lid, though a chain is preferable.

The bent rod is sufficient under ordinary circumstances to automatically actuate the lid to close the slots of the cover, and the spring is therefore only shown as a modification.

The advantages of my construction are, first, that a vessel is provided with a suitable cover to confine the heat of its contents; second, that the lid provides for pouring off any portion of the liquid contents without exposing the remainder to the cold air, as well as to strain the liquid from the solid contents—such as meats, vegetables, &c.; third, that effectual means are provided for preventing rising steam, when pouring off the contents, from scalding the hand necessarily employed to hold the cover in place during such operation; and, finally, that such construction involves but little additional expense over the ordinary cover.

Having thus described my invention, what I claim, and desire to secure by Letters Patent, is—

1. The combination, with a vessel-cover having a pivoted bail and provided with slots or perforations, of a hinged supplemental lid adapted to close said slots and connected with the pivoted bail, whereby said bail and lid are simultaneously operated, substantially as described.

2. The combination, with a vessel-cover having a pivoted bail and provided with slots, of a spring-actuated supplemental lid adapted to close said slots and connected with the bail, substantially as described.

CHARLES GAYLORD.

Witnesses:
JNO. G. ELLIOTT,
W. W. ELLIOTT.